US 6,714,006 B2

(12) United States Patent
Mackay et al.

(10) Patent No.: US 6,714,006 B2
(45) Date of Patent: Mar. 30, 2004

(54) INTEGRATED FIELD GENERATOR FOR ACTUATING MAGNETIC HEADS

(75) Inventors: Kenneth Donald Mackay, San Jose, CA (US); Antonio Perez, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 10/226,464

(22) Filed: Aug. 22, 2002

(65) Prior Publication Data

US 2004/0036471 A1 Feb. 26, 2004

(51) Int. Cl.[7] .................... G01R 33/12; G11B 5/455; G11B 5/39
(52) U.S. Cl. ..................................... 324/210; 324/235
(58) Field of Search ............... 324/210–212, 324/235; 29/593; 360/110

(56) References Cited

U.S. PATENT DOCUMENTS

| 4,853,633 | A | * | 8/1989 | Matsumoto | 324/210 |
| 4,950,989 | A | * | 8/1990 | Jones | 324/216 |
| 5,696,445 | A | | 12/1997 | Inbar | 324/228 |
| 5,721,488 | A | | 2/1998 | Sakai et al. | 324/210 |
| 5,854,492 | A | | 12/1998 | Chinone et al. | 257/31 |
| 5,926,019 | A | | 7/1999 | Okumura | 324/210 |
| 6,340,885 | B1 | | 1/2002 | Hachisuka et al. | 324/210 |
| 2001/0048303 | A1 | | 12/2001 | Hachisuka et al. | 324/210 |

* cited by examiner

Primary Examiner—Jay Patidar
(74) Attorney, Agent, or Firm—Silicon Valley IP Group, PC; Dominic M. Kotab

(57) ABSTRACT

A structure is integrated into the design and manufacture of a magnetic head that allows self-generation of magnetic fields. The structure includes a conductor or conductors placed in close proximity to the read portion of a magnetic head and connected to an externally accessible connection. A high frequency signal is passed through the conductor to generate a magnetic field through the read device and simulate, for example, the head crossing magnetic domains on a magnetic memory disk.

21 Claims, 4 Drawing Sheets

INTEGRATED FIELD GENERATOR FOR ACTUATING MAGNETIC HEADS

FIELD OF THE INVENTION

The present invention relates to magnetic heads, and more particularly, this invention relates to a mechanism integrated in the head itself for generating a magnetic field for testing the head.

BACKGROUND OF THE INVENTION

Magnetoresistive heads are devices suitable for reading magnetically-recorded information, for example, information stored on a magnetic tape or disk. Magnetoresistive heads contain a material which has a resistance that varies as a function of the strength of the magnetic field applied to it. For such materials, if the resistance of the head in the absence of a magnetic field is R, the resistance of the material in the presence of a magnetic field of strength B will be some lower value R−r. Generally, r, the function which expresses the dependence of the resistance of the material on the applied magnetic field, is a symmetric nonlinear function with an absolute maximum at the point B=0.

The resistive properties of a typical magnetoresistive device are illustrated in FIG. 1, which is an idealized graph of the resistance $R_{total}$ of the device (on the vertical axis) as a function of the strength of the applied magnetic field B (on the horizontal axis). From FIG. 1, it can be seen that the resistance curve 10 includes a constant component R (defined as the maximum resistance of the device at the point about which the resistance curve 10 is symmetric) and a component r which varies as a function of the applied magnetic field. The total resistance, then, is $R_{total}=R-r(B)$, because the resistance $R_{total}$ decreases around the point where R is measured as a function of the applied magnetic field.

Before a magnetoresistive head is employed to read magnetically-recorded information on a disk drive, a test of its resistive properties as a function of an applied magnetic field is usually performed to ensure quality control. Current magnetic head testers rely on external devices to generate magnetic fields, which are sensed by the read device in the head and react to field transitions. In particular, current testers subject the magnetic head to a fluctuating magnetic field generated by passing a controlled current through an appropriate winding (coils of electromagnets) of an external magnetic field generator.

This prior-art method for testing magnetoresistive heads suffers from several disadvantages. The first of these is that the frequency of operation of the tester is very limited. Due to problems with resistance and inductance in the electromagnets, there is no practical method to increase the testing frequency or frequency of operation. In addition, small errors in physical location cause significant errors in calibration, errors in response due to external perturbations, and shifts in response due to electrical currents caused by the flu lines saturating the entire device during testing.

The current state of the art row level or slider level test is running in the low kHz range and many of the commonly available external testers operate at pseudo DC data rates.

A typical prior-art tester for measuring the resistive properties of a magnetoresistive element 11 as a function of applied magnetic field B is illustrated in FIG. 2. The prior-art tester includes an electromagnet 12, to which a DC current is applied by a controllable power supply 14. The power supply 14 supplies current to the magnet 12 in an alternating or patterned fashion, as shown in the graph 16. Each step changes the value of the applied magnetic field B.

The magnetoresistive element 11 is placed in the magnetic field created by the electromagnet 12 and a bias current 18 is applied to it. The bias current 18 ($i_{bias}$) is usually given a value typical of that anticipated during use of the head in a disk drive or other data storage medium. The magnetoresistive element 11 is shown as two separate resistances 20 and 22. Resistance 20 represents the no magnetic field or background resistance R which does not vary as a function of B, while variable resistance 22 represents the much smaller resistance r which varies as a function of the applied magnetic field B and which is the quantity of interest for most applications of magnetoresistive heads. As illustrated in FIG. 1, values for r are taken to be positive, so that the total resistance of the magnetoresistive element 11 is given by $R_{total}=R-r(B)$.

The device illustrated in FIG. 2 includes a resistance measuring device 24 which measures Rtotal as a function of the magnetic field B applied by the magnet 12 at each value of the current provided to the magnet 12 by the power supply 14. The resistance measuring device 24 is usually chosen to be a resistance bridge which is balanced to obtain the value of $R_{total}$ each time the magnetic field B is changed by the power supply 14.

DISCLOSURE OF THE INVENTION

According to one embodiment, an additional structure is integrated into the design and manufacture of a magnetic head that allows self-generation of magnetic fields from within the head. This structure, being small in physical size and in close proximity to the reader portion of the head, allows for testing at data rates well beyond the capability of existing testers. Today's state of the art magnetic recording head testers are limited to operational frequencies in the kHz range. Embodiments of the present invention allow operation into the multiple megahertz range.

The device includes a conductor or conductors placed in close proximity to the read portion of a magnetic recording head and connected to an externally accessible connection. A high frequency signal is passed through the conductor to generate a magnetic field through the read device and simulate, for example, the head crossing magnetic domains on a magnetic memory disk. With the ability to control the size and placement of the conductor, the field generated is proportional to the applied current waveform. Further, the device can be constructed in a fashion that allows disablement of the conductor by laser ablation, mechanical cutting, electrical overcurrent, etc. if desired.

Thus, the embodiments presented herein provide a structure added to a magnetic head at extremely low cost using existing manufacturing techniques, and provide a very high data rate test capability in a controlled environment.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
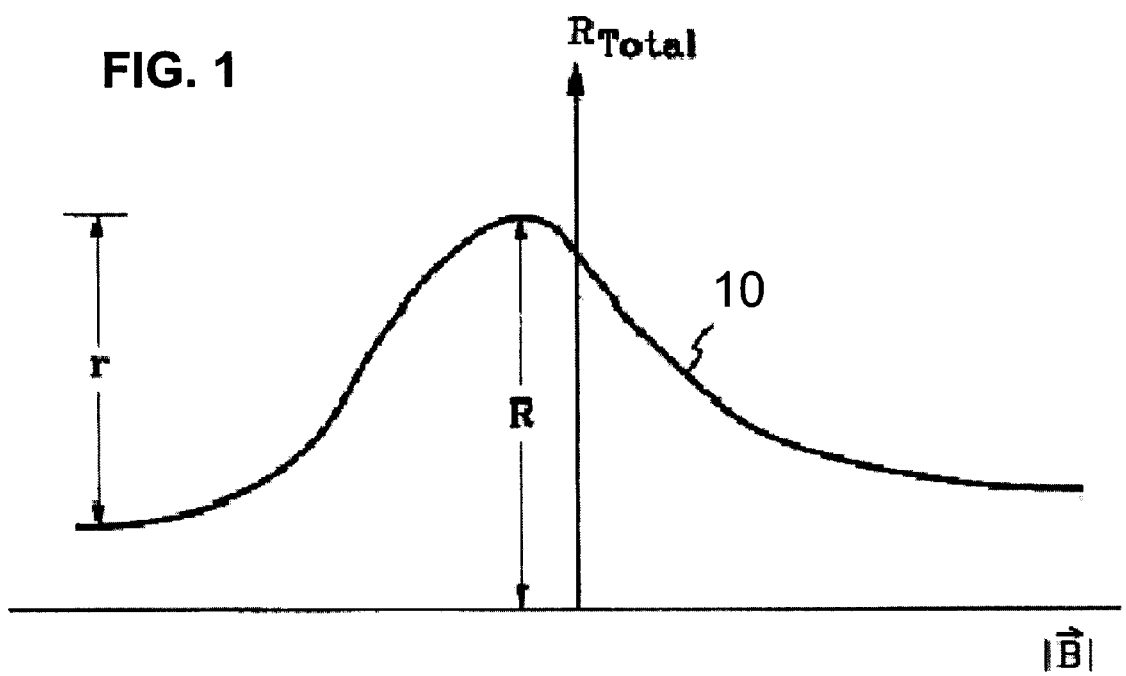
FIG. 1 is a graph illustrating the resistance properties of a typical magnetoresistive device.
Figure 2:
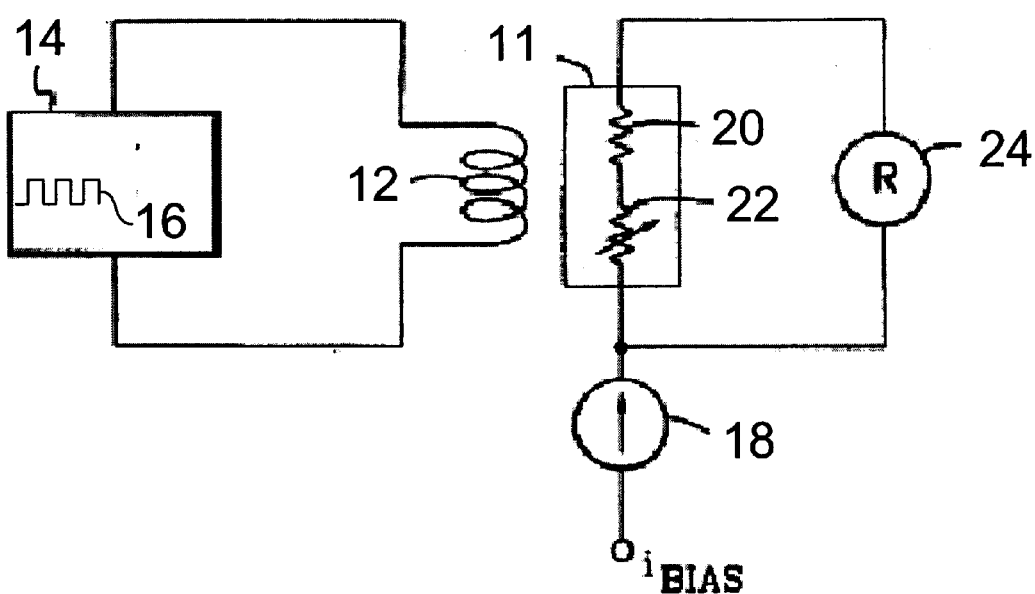
FIG. 2 is a schematic diagram illustrating a typical prior-art resistance tester for measuring the resistance of a magnetoresistive device for testing functionality of the device.
Figure 3:
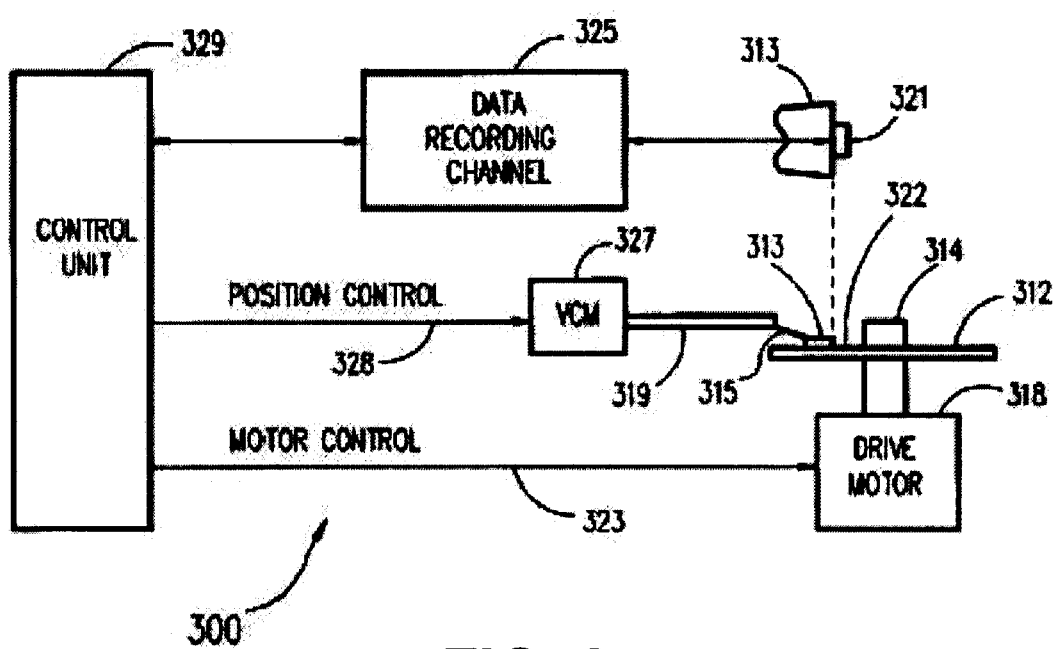
FIG. 3 is a perspective drawing of a magnetic disk drive system in accordance with one embodiment.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different tracks of the disk where desired data are recorded. Each slider 313 is attached to an actuator arm 319 by means way of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

Figure 4:
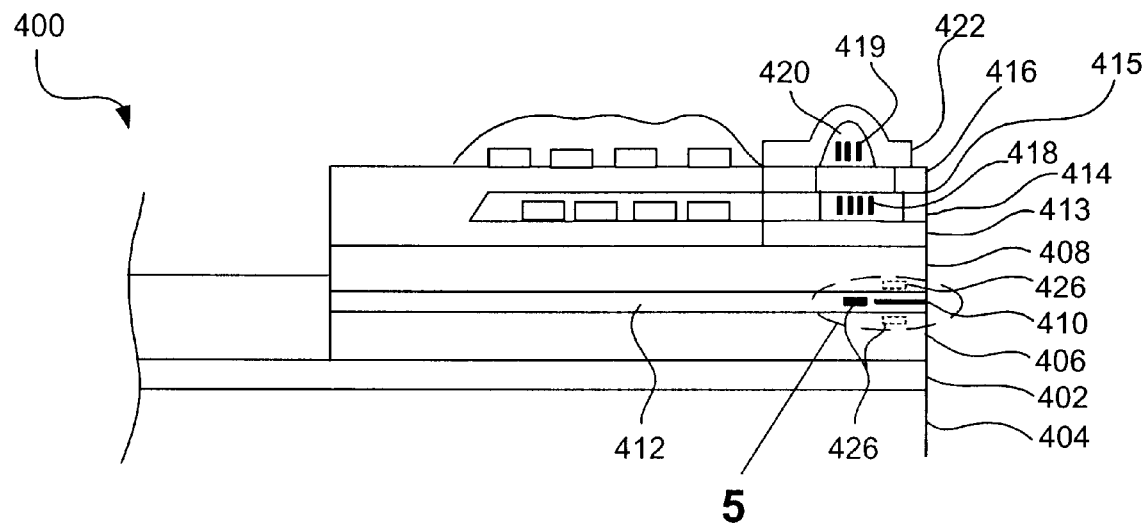
FIG. 4 is a cross sectional view of a magnetic recording head according to one embodiment.

FIG. 4 is a cross sectional view of a magnetic recording head 400 according to one embodiment in which an additional structure is integrated into the design and manufacture of the magnetic head 400, allowing self-generation of magnetic fields from within the head. In FIG. 4, the reference numeral 404 denotes a substrate, 402 denotes an undercoating, 406 denotes a lower shield layer of the MR/GMR reproducing head part, 408 denotes an upper shield layer, 410 denotes a MR/GMR layer (read portion) provided through an insulating layer 412 between the lower shield layer 406 and the upper shield layer 408, 413 denotes a bottom writer pole of the write element, 414 denotes a pedestal on the bottom writer pole, 416 denotes top write pole above a write gap 415, 418 denotes a first coil layer, 419 denotes a second coil, 420 denotes an upper insulating layer deposited so as to cover the second coil conductor 418, and 422 denotes an upper yoke stitched to the top pole 416 near ABS. The upper auxiliary pole 422 is magnetically connected with the bottom pole (upper shield layer) 408 at its rear portion so as to constitute a magnetic yoke together with the lower auxiliary pole 408. The new head 400 also includes a conductor 426 or conductors placed in close proximity to the read portion 410 of the magnetic head and connected to an externally accessible connection.

Figure 5:
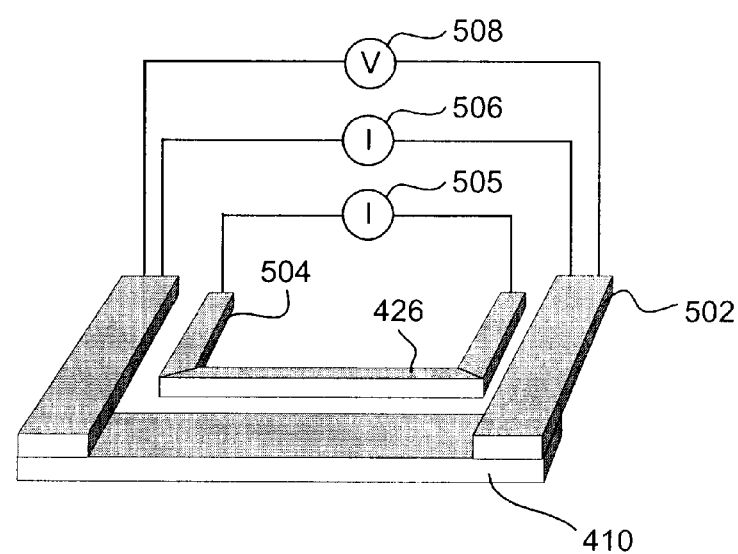
FIG. 5 is a partial detailed diagram taken from Circle 5 of FIG. 4.

FIG. 5 is a partial detailed diagram taken from Circle 5 of FIG. 4. As shown, the conductor 426 is positioned close to the read portion 410. The read portion 410 includes electrical leads 502. The conductor 426 also includes electrical leads 504, preferably made of the same material as the conductor 426 for efficient and simple manufacture.

As mentioned above in the discussion of the prior art, to test a magnetic head, the state of the art is to apply a magnetic field externally to actuate the read portion. That actuation changes the resistance of the read portion, thereby changing its voltage. In this way, the functionality of the read portion can be tested. However, as discussed above, using an external field generator has many drawbacks, including limits on simulated data frequency, positional constraints leading to control problems and sporadic results, and high power consumption.

The embodiment shown in FIGS. 4 and 5 allow testing of the read portion 410 without requiring application of an external magnetic field. Rather, a high frequency signal from a current source 505 is passed through the conductor 426 to generate a magnetic field therearound. Because it is nearly immediately adjacent, the magnetic field goes into the read portion 410 and provides a similar effect as an external magnetic field. The pulsing of the signal current simulates the head crossing magnetic domains on a magnetic memory disk, magnetic tape, or other type of media. With the ability to control the size and placement of the conductor 426, the field generated is proportional to the applied current waveform.

During testing, source current is sent to the read portion 410 via current source 506. See FIG. 5. The voltage of the current through the read portion 410 is sensed by voltage meter 508. The current is pulsed according to the signal waveform to simulate actual performance of a disk. The waveform may be a series of high/low signals or a pattern of high/low signals at a high data rate.

In addition, since the conductor 426 is microscopic, the applicable laws of physics are different than those that apply to external field generators. This structure, being small in physical size and in close proximity to the reader portion of the head, allows for testing at data rates well beyond the capability of existing testers. Currently, state of the art external magnetic recording head testers are limited to operational frequencies in the kHz range (3–5 kHz). The new structure presented herein allows operation into the multiple megahertz range. With the new structure, testing at 0 to 500,000 kHz or more is possible, which is more like actual "in use" conditions.

Also, because of the physics of this structure, very little power supply is needed. A preferred embodiment requires only about 3–6 mA. The prior art external systems require a much higher current, somewhere in the range of 6–10 Amperes.

The embedded conductor 426 will not create any heating damage to the head 400, due to the extremely small current at low voltage passing through the conductor 426. Further, much of the heat generated in the conductor 426 is conducted back to the slider body by its electrical connections 504.

A further improvement over the prior art is that placement of the conductor 426 is not critical. In prior art system, the placement of the external magnetic field generator had to be positioned very carefully. Small errors in physical location caused significant errors in calibration, errors in response due to external perturbations, and shifts in response caused by to electrical currents due to the flux lines saturating the entire device during testing.

According to the present invention, the conductor 426 can be placed behind the read portion 410 (as shown in FIGS. 4 and 5), above the read portion 410 (as shown in shadow in FIG. 4), and/or below the read portion 410 (as also shown in shadow in FIG. 4), for example. Thus, combinations of multiple conductors, 426 in these locations can be created. It need only be within close proximity of the read portion 410. Preferably, the conductor 426 is positioned within as close a proximity as permitted by the state of lithography and plating capabilities at the time of manufacture.

Also advantageously, the conductor 426 can be created in a much more controlled environment because it can be photographically placed during creation of the head 400. Thus, a manufacturer need only characterize the conductor 426 once on the wafer, and then will know how it will behave in all sliders on the wafer.

Further, because the conductor 426 is photographically placed, the read portion 410 can be tested at the wafer level, row level, slider level, and even on suspended heads.

One preferred material for the conductor 426 is Cu, although other materials capable of creating a magnetic field upon application of current therethrough may be used. The conductor 426 and its lead lines 504 can be of the same material, so they can be plated, deposited, formed, etc. at the same time.

If Cu is used, the conductor 426 can also act as a temperature sensor. Cu changes its resistance by about 4% per degree Celsius. So upon application of current to the read portion 410, the conductor 426 can be used to sense how the read portion 410 is heating based on change of resistivity of the conductor 426. A voltage meter such as the meter 508 used to measure the current through the read portion 410 can be used with the conductor 426.

Figure 6:
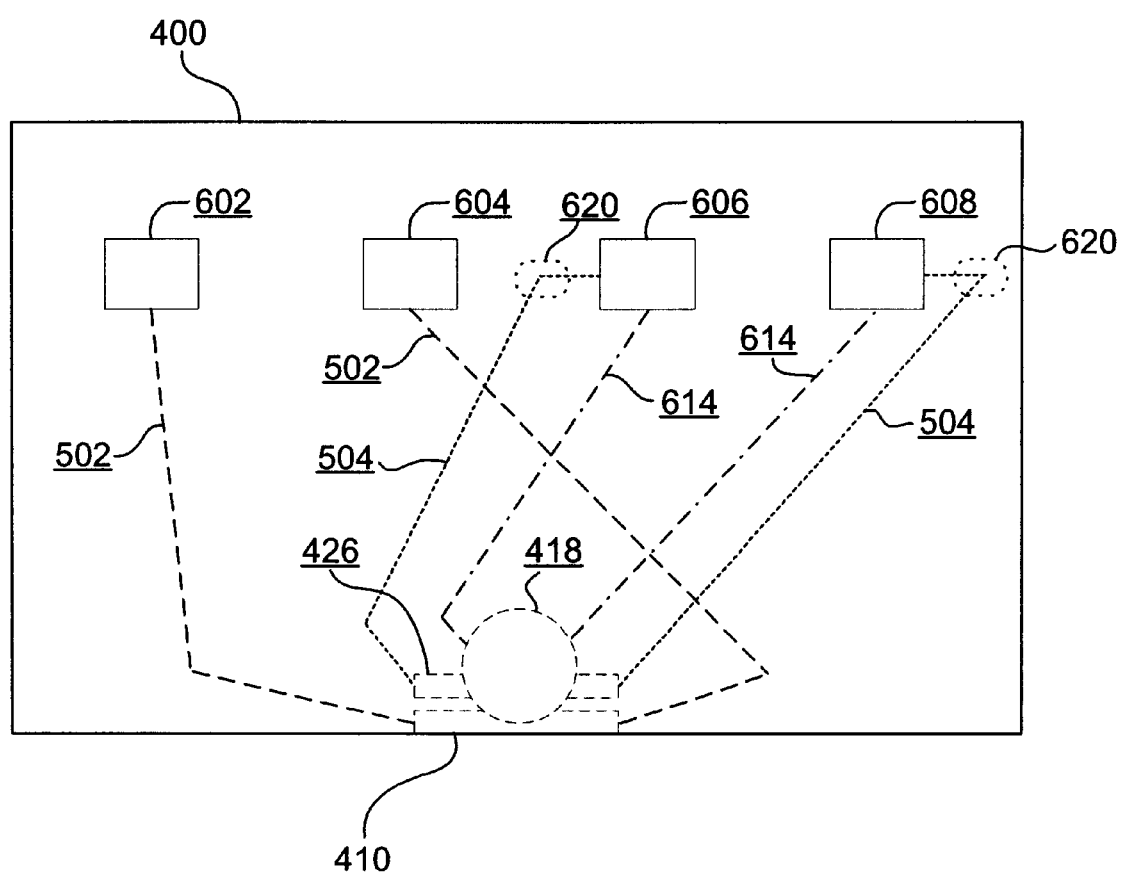
FIG. 6 depicts a wiring structure of a head according to an illustrative embodiment.

FIG. 6 depicts a wiring structure of a head 400 according to an illustrative embodiment. In this embodiment, the head 400 includes four paths 602, 604, 606, 608 on the slider. The read portion 410 is connected to two paths 602, 604 by leads 502. The coil 418 is connected to the other two paths 606, 608 by lines 614. The conductor 426 is connected to the same paths 606, 608 as the coil 418 via leads 504. Current is applied to the coil paths to create the magnetic field above the conductor 426. One advantage of the wiring scheme of FIG. 6 is that costs are reduced, since the coil paths 606, 608 serve the dual purpose of driving the write coil 418 and the conductor 426.

Preferably, the head structure is constructed in a fashion that allows disablement of the conductor 426 if desired. Methods of disablement include, but are not limited to, laser ablation, mechanical cutting, electrical overcurrent, etc. For example, the leads 504 to the conductor 426 can be positioned such that they can be cut with a laser, saw, or other cutting means. Referring to FIG. 6, exemplary areas 620 are depicted where leads 504 can be cut.

The leads 504 to the conductor 426 can also be manufactured in such a way that they are sensitive to application of a high current, such that they burn out like a fuse when a high current is applied.

In use, the recording head structure and improvements set forth herein can be used in magnetic recording heads for any type of magnetic media, including but not limited to disk media and magnetic tape.

While various embodiments have been described above, it should be understood that they have been presented by way of example only, and not limitation. For example, the structures and methodologies presented herein are generic in their application to all MR heads, AMR heads, GMR heads, spin valve heads, etc. Thus, the breadth and scope of a preferred embodiment should not be limited by any of the above-described exemplary embodiments, but should be defined only in accordance with the following claims and their equivalents.

What is claimed is:

1. A magnetic head, comprising:
    a read portion; and
    a conductor embedded in the magnetic head and positioned towards the read portion, the conductor creating a magnetic field upon application of a current thereto;
    wherein a change in resistivity of the read portion in response to the magnetic field created by the conductor is measurable.

2. The magnetic head as recited in claim 1, and further comprising a write portion.

3. The magnetic head as recited in claim 2, and further comprising electrical connections coupled to the write portion, wherein the conductor is also coupled to the electrical connections.

4. The magnetic head as recited in claim 1, wherein the current is pulsed to simulate passage of the head over a magnetic medium.

5. The method as recited in claim 1, wherein the current is pulsed at a rate greater than 500,000 kilohertz.

6. The magnetic head as recited in claim 1, wherein the conductor is formed during manufacture of the magnetic head.

7. The magnetic head as recited in claim 1, wherein the current applied to the conductor is less than 1 ampere.

8. The magnetic head as recited in claim 1, wherein the current applied to the conductor is less than 10 milliamperes.

9. The magnetic head as recited in claim 1, wherein the conductor is disabled upon application of a current exceeding a predetermined threshold.

10. The magnetic head as recited in claim 1, wherein the conductor is disabled by cutting an electrical connection thereof.

11. The magnetic head as recited in claim 1, wherein the conductor also functions as a temperature sensor for measuring a temperature of the read portion.

12. A method for testing a magnetic head, comprising:

applying a sense current through a read portion of the magnetic head;

applying a test current to a conductor embedded in the magnetic head, the conductor creating a magnetic field upon application of the test current thereto;

pulsing the test current for varying the magnetic field created by the conductor;

sensing a change in resistivity of the read portion in response to the magnetic field created by the conductor.

13. The method as recited in claim 12, wherein the conductor is formed during manufacture of the magnetic head.

14. The method as recited in claim 12, wherein the test current applied to the conductor is less than 1 ampere.

15. The method as recited in claim 12, wherein the test current applied to the conductor is less than 10 milliamperes.

16. The method as recited in claim 12, wherein test current is pulsed at a rate greater than 500,000 kilohertz.

17. The method as recited in claim 12, wherein the conductor is disabled upon application of a current exceeding a predetermined threshold.

18. The method as recited in claim 12, wherein the conductor is disabled by cutting an electrical connection thereof.

19. The method as recited in claim 12, wherein the magnetic head includes a write portion and electrical connections coupled to the write portion, wherein the conductor is also coupled to the electrical connections.

20. The method as recited in claim 12, and further comprising sensing a temperature of the read portion utilizing the conductor.

21. A magnetic storage system, comprising:

magnetic media;

at least one head for reading from and writing to the magnetic media, each head having:

a read portion;

a write element coupled to the read portion, the write element having an electrically conductive coil passing therethrough; and a conductor embedded in the magnetic head and positioned towards the read portion, the conductor creating a magnetic field upon application of a current thereto, wherein a change in resistivity of the read portion in response to the magnetic field created by the conductor is measurable;

a slider for supporting the head; and a control unit coupled to the head for controlling operation of the head.

* * * * *